(12) United States Patent
Maltagliati et al.

(10) Patent No.: US 7,974,435 B2
(45) Date of Patent: Jul. 5, 2011

(54) PATTERN-BASED ENCODING AND DETECTION

(75) Inventors: Alan G. Maltagliati, St. Louis, MO (US); Yousri H. Barsoum, Manchester, MO (US); James G. Withers, Chesterfield, MO (US)

(73) Assignee: Koplar Interactive Systems International LLC, St. Louis, MO (US)

( * ) Notice: Subject to any disclaimer, the term of this patent is extended or adjusted under 35 U.S.C. 154(b) by 1074 days.

(21) Appl. No.: 11/532,835

(22) Filed: Sep. 18, 2006

(65) Prior Publication Data

US 2007/0071322 A1    Mar. 29, 2007

Related U.S. Application Data

(60) Provisional application No. 60/717,914, filed on Sep. 16, 2005.

(51) Int. Cl.
*G06K 9/00* (2006.01)
*G06K 9/54* (2006.01)

(52) U.S. Cl. ........................................ 382/100; 382/305

(58) Field of Classification Search .................. 382/100, 382/305

See application file for complete search history.

(56) References Cited

U.S. PATENT DOCUMENTS

| | | | |
|---|---|---|---|
| 4,807,031 A | 2/1989 | Broughton et al. | |
| 5,305,104 A | 4/1994 | Jensen et al. | |
| 5,521,984 A * | 5/1996 | Denenberg et al. | 382/209 |
| 5,594,493 A | 1/1997 | Nemirofsky | |
| 5,644,363 A | 7/1997 | Mead | |
| 5,767,896 A | 6/1998 | Namirofsky | |
| 5,880,769 A | 3/1999 | Nemirofsky et al. | |
| 5,907,350 A | 5/1999 | Nemirofsky | |
| 5,953,047 A | 9/1999 | Nemirofsky | |
| 6,094,228 A | 7/2000 | Ciardullo et al. | |
| 6,215,526 B1 | 4/2001 | Barton et al. | |
| 6,229,572 B1 | 5/2001 | Ciardullo et al. | |

(Continued)

FOREIGN PATENT DOCUMENTS

EP    0957448    11/1999

(Continued)

OTHER PUBLICATIONS

Calic, Janko, "Highly Efficient Low Level feature extraction for Video representation and Retrieval", *Ph. D. thesis by Janco Calic, submitted to Department of Electronic enoineering*, Queen Marv. university of London; 2004.

(Continued)

*Primary Examiner* — Wenpeng Chen
(74) *Attorney, Agent, or Firm* — Clise, Billion & Cyr, P.A.; Tim Clise

(57) ABSTRACT

A method and system for encoding a content signal having one or more content segments. The one or more content segments of the content signal are identifying or obtained. One or more encoded patterns are superimposed or inserted in a segment portion of at least one of the one or more content segments by use of an insertion method that renders the one or more encoded patterns substantially invisible within the content signal. A method for detecting an encoded message within an encoded content signal. A pattern format is identified in at least one of the content segments. One or more encoded patterns are extracted from the one or more pattern formatted identified content segments. The one or more encoded patterns are decoded. The encoded message decoded from the encoded content signal is utilized.

19 Claims, 14 Drawing Sheets

U.S. PATENT DOCUMENTS

| | | | |
|---|---|---|---|
| 6,285,774 B1 * | 9/2001 | Schumann et al. | 382/100 |
| 6,370,275 B1 | 4/2002 | Benoit et al. | |
| 6,404,440 B1 | 6/2002 | Doyen et al. | |
| 6,449,379 B1 | 9/2002 | Rhoads | |
| 6,473,804 B1 * | 10/2002 | Kaiser et al. | 709/245 |
| 6,604,682 B2 | 8/2003 | Wakamiya et al. | |
| 6,661,905 B1 | 12/2003 | Chupp et al. | |
| 6,766,956 B1 | 7/2004 | Boylan et al. | |
| 7,025,272 B2 | 4/2006 | Yavid et al. | |
| 7,156,311 B2 | 1/2007 | Attia et al. | |
| 7,167,209 B2 | 1/2007 | Cookson et al. | |
| 7,168,621 B2 | 1/2007 | Ghai et al. | |
| 7,242,816 B2 | 7/2007 | Attia et al. | |
| 7,245,780 B2 | 7/2007 | Attia et al. | |
| 7,287,696 B2 | 10/2007 | Attia et al. | |
| 7,296,747 B2 | 11/2007 | Rohs | |
| 7,309,015 B2 | 12/2007 | Frantz et al. | |
| 7,502,759 B2 * | 3/2009 | Hannigan et al. | 705/51 |
| 7,567,671 B2 * | 7/2009 | Gupte | 380/239 |
| 7,570,781 B2 * | 8/2009 | Rhoads et al. | 382/100 |
| 7,808,554 B2 * | 10/2010 | Soneira | 348/460 |
| 2001/0009867 A1 * | 7/2001 | Sakaguchi et al. | 463/42 |
| 2001/0017932 A1 * | 8/2001 | Chang | 382/100 |
| 2002/0016750 A1 | 2/2002 | Attia | |
| 2002/0080271 A1 * | 6/2002 | Eveleens et al. | 348/473 |
| 2002/0112250 A1 | 8/2002 | Koplar et al. | |
| 2002/0183102 A1 | 12/2002 | Withers et al. | |
| 2003/0189731 A1 * | 10/2003 | Chang | 358/3.28 |
| 2003/0229900 A1 * | 12/2003 | Reisman | 725/87 |
| 2004/0262395 A1 | 12/2004 | Longacre, Jr. | |
| 2004/0262399 A1 | 12/2004 | Longacre, Jr. | |
| 2005/0004844 A1 | 1/2005 | Attia | |
| 2005/0011957 A1 | 1/2005 | Attia et al. | |
| 2005/0015310 A1 | 1/2005 | Frantz et al. | |
| 2005/0015311 A1 | 1/2005 | Frantz et al. | |
| 2005/0029354 A1 | 2/2005 | Frantz et al. | |
| 2005/0029356 A1 | 2/2005 | Frantz et al. | |
| 2005/0033599 A1 | 2/2005 | Frantz et al. | |
| 2005/0035206 A1 | 2/2005 | Attia et al. | |
| 2005/0082370 A1 | 4/2005 | Frantz et al. | |
| 2005/0094031 A1 | 5/2005 | Tecot | |
| 2005/0121521 A1 | 6/2005 | Ghai et al. | |
| 2005/0125301 A1 | 6/2005 | Muni | |
| 2005/0246196 A1 | 11/2005 | Frantz et al. | |
| 2005/0264694 A1 | 12/2005 | Ilan et al. | |
| 2006/0011728 A1 | 1/2006 | Frantz et al. | |
| 2006/0080556 A1 | 4/2006 | Rhoads | |
| 2006/0175413 A1 | 8/2006 | Longacre | |
| 2006/0188128 A1 | 8/2006 | Rhoads | |
| 2006/0193530 A1 | 8/2006 | Attia et al. | |
| 2006/0200260 A1 | 9/2006 | Hoffberg | |
| 2006/0236266 A1 * | 10/2006 | Majava | 715/810 |
| 2006/0282855 A1 * | 12/2006 | Margulis | 725/43 |
| 2006/0287105 A1 * | 12/2006 | Willis | 463/42 |
| 2007/0022437 A1 * | 1/2007 | Gerken | 725/41 |
| 2007/0063050 A1 | 3/2007 | Attia et al. | |
| 2007/0230921 A1 | 10/2007 | Barton et al. | |
| 2008/0030614 A1 | 2/2008 | Schwab et al. | |
| 2008/0193023 A1 | 8/2008 | Canel-Katz et al. | |

FOREIGN PATENT DOCUMENTS

| | | |
|---|---|---|
| WO | WO-9964980 | 12/1999 |

OTHER PUBLICATIONS

Australian Patent Application No. 2004226927, Examiner's First Report dated Feb. 13, 2009 (2 pages).

U.S. Appl. No. 10/817,109 Preliminary Amendment, 8 pgs.

"U.S. Appl. No. 10/817,109, Final Office Action mailed Sep. 5, 2008", 14 pgs.

"U.S. Appl. No. 10/817,109, Non-Final Office Action mailed Nov. 8, 2007", 12 pgs.

"U.S. Appl. No. 10/817,109, Preliminary Amendment filed Apr. 4, 2007", 8 pgs.

"U.S. Appl. No. 10/817,109, Response filed Jul. 18, 2008 to Final Office Action mailed Feb. 20, 2008", 12 pgs.

"U.S. Appl. No. 10/817,109, Response to Non-Final Office Action filed Nov. 30, 2007", 11 pgs.

"U.S. Appl. No. 10/817,109, Preliminary Amendment filed Apr. 29, 2005", 13 pgs.

"U.S. Appl. No. 10/817,109, Final Office Action Mailed Feb. 20, 2008", 14 pgs.

* cited by examiner

PATTERN-BASED ENCODING AND DETECTION

CROSS-REFERENCE TO A RELATED APPLICATION

This application claims the benefit of U.S. Provisional Patent Application entitled "Pattern-Based Encoding and Detection", Ser. No. 60/717,914, filed 16 Sep. 2005, the entire contents of which is herein incorporated by reference.

FIELD

The present application relates generally to the technical field of signal-processing and, in one specific example, to a method and system for pattern-based encoding and detection.

BRIEF DESCRIPTION OF THE DRAWINGS

Some embodiments are illustrated by way of example and not limitation in the figures of the accompanying drawings in which.

DETAILED DESCRIPTION

Figure 1:
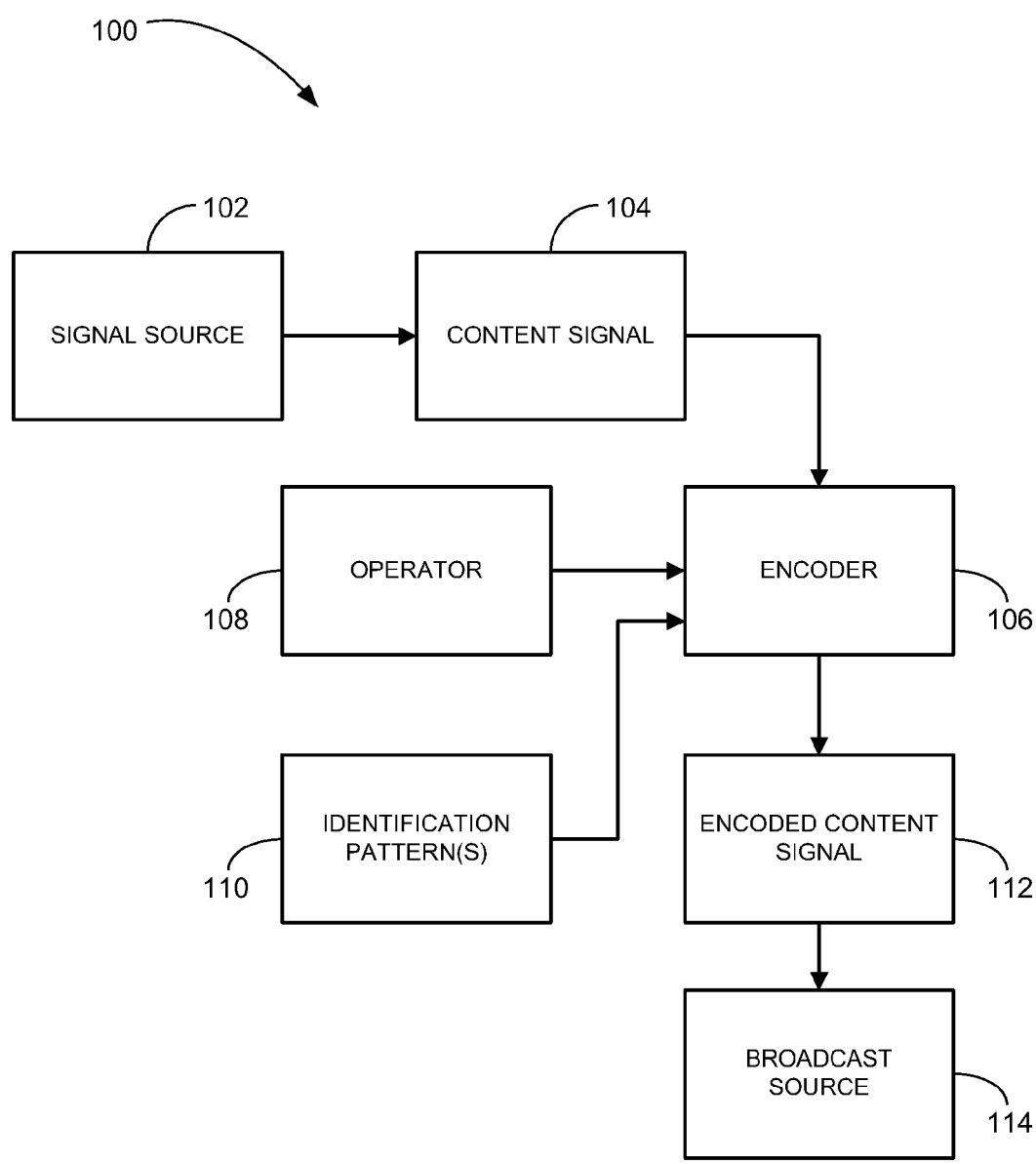
FIG. 1 is a block diagram illustrating an example embodiment of an encoding system.

Example methods and systems for pattern-based encoding and detection are described. In the following description, for purposes of explanation, numerous specific details are set forth in order to provide a thorough understanding of example embodiments. It will be evident, however, to one skilled in the art that the present invention may be practiced without these specific details Referring to FIG. 1, an example encoding system 100 is illustrated. The encoding system 100 may transmit a content signal 104 from a signal source 102 to an encoder 106.

The content signal 104 may include a sequence of images and optionally associated audio. Examples of the content signal 104 include standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, a sequence of JPEGs (Joint Photographic Experts Group) sequence of bitmaps, or other signal formats that transport a sequence of images. It may be appreciated that the form of the content signal 104 may be modified to enable implementations involving the content signals 104 of various formats and resolutions.

The signal source 102 may be a unit that is capable of transmitting and/or reproducing a sequence of images electrically in the form of the content signal 104. Examples of the signal source 102 include a professional grade video tape player with a video tape, a camcorder, a video file server, a computer with an output port and a digital versatile disc (DVD) player with a DVD disc, and the like. An example embodiment of the encoder 106 is described in greater detail below.

The operator 108 may interact with the encoder 106 to control its operation to encode the content signal 104 with a message (e.g., an encoded message) defined in the form of one or more identification patterns 110, thereby producing an encoded content signal 112 that may be provided to a broadcast source 114. In an example embodiment, the operator 108 may include a person that interacts with the encoder 106 through the use of a computer or other electronic control device. The operator 108 may consist entirely of computer hardware and/or software, or other electronic control device that directs operation of the encoder 106 in an automated manner.

In an example embodiment, the identification pattern 110 may be in the form of a bar code. The bar code may be one-dimensional such as a UPC bar code. The bar code may be multi-dimensional (e.g., two-dimensional bar codes such as an Aztec code, Data Matrix, Dataglyph, MaxiCode, PDF417, QR Code, Ultra Code or UCC RSS-2D bar code). Other machine readable representations of data in a visual form may also be used.

In an example embodiment, the identification pattern 110 may include one or more bar codes. Other symbols and shapes that can be matched and interpreted may also be used as the identification pattern 110.

The encoded content signal 112 may be provided to the broadcast source 114 for distribution and/or transmission to an end-user (e.g., a viewer) who may view the content associated with encoded content signal 112. The broadcast source 114 may deliver content to one or more viewers in formats including analog and/or digital video by storage medium such as DVD, tapes, and other fixed medium and/or by transmission sources such as television broadcast stations, cable, satellite, wireless and Internet sources that broadcast or otherwise transmit content.

Figure 2:
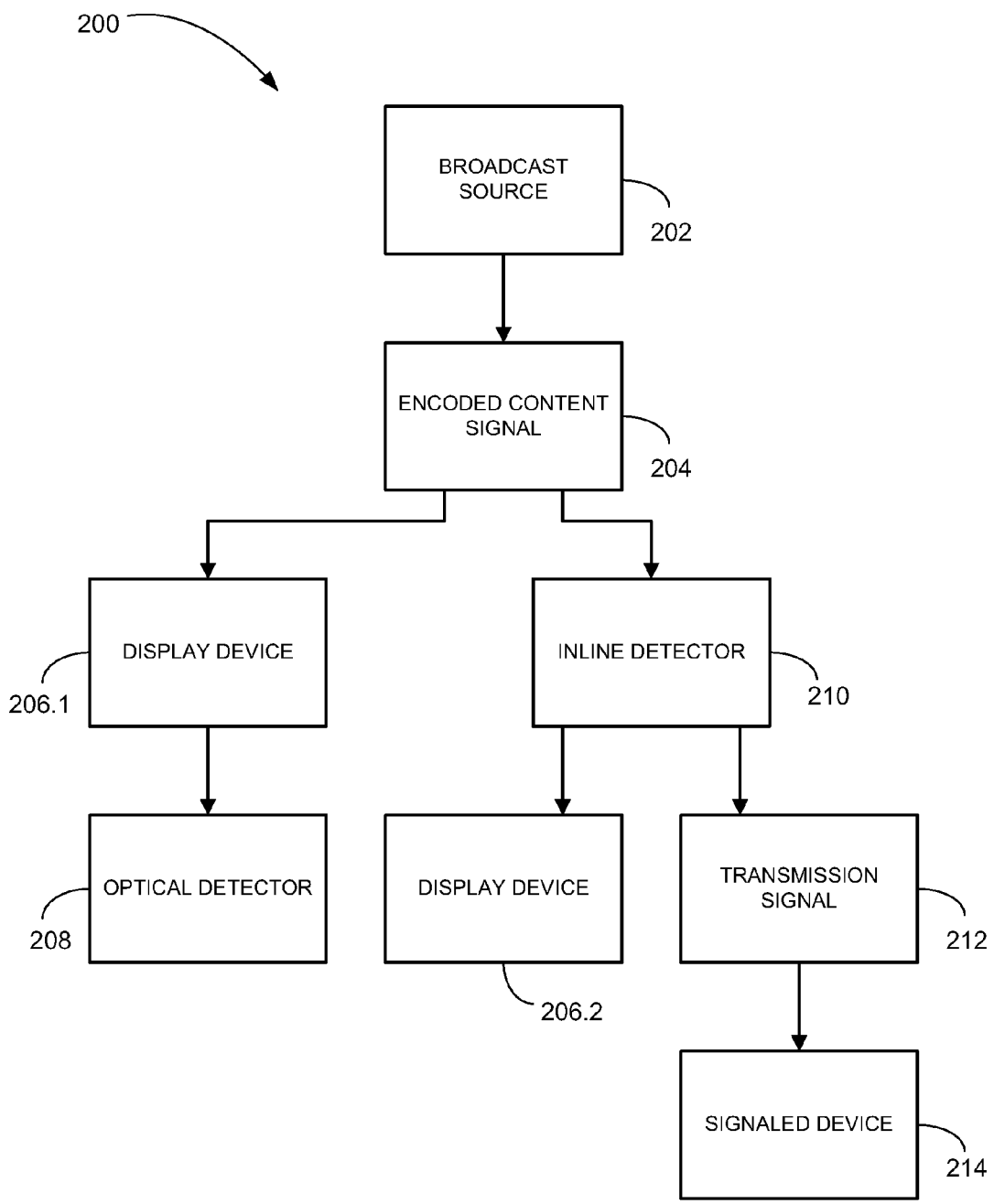
FIG. 2 is a block diagram illustrating an example embodiment of a detection system.

Referring to FIG. 2, an example detection system 200 is illustrated. The detection system 200 may transmit an encoded content signal 204 to a display device 206.1 or an inline detector 210. In an example embodiment, the encoded content signal 204 may be the encoded content signal 112 (see FIG. 1).

The inline detector 210 may receive the encoded content signal 204 electrically from the broadcast source 202, and thereafter may transmit a transmission signal 212 to a signaled device 214 and optionally provide the encoded content signal 204 to a display device 206.2. An example embodiment of the inline detector 210 is described in greater detail below.

In an example embodiment, the inline detector 210 may detect the identification pattern 110 (see FIG. 1) encoded within the encoded content signal 204 and transmit a message to the signaled device 214 by use of the transmission signal 212 and optionally provide the encoded content signal 204 to a display device 206.2. The transmission signal 212 may include a wireless radio frequency, infrared and direct wire connection, and other transmission mediums by which signals may be sent and received.

The signaled device 214 may be a device capable of receiving and processing the message transmitted by the transmission signal 212. In an example embodiments the message may be a trigger for an event on the signaled device 214. For example, the events may include a promotional opportunity, electronic game play enhancement, sound and/or lights on the signaled device 214 may operate, and the like. In an example embodiment, the message may provide an indication of a presence of rights associated with the encoded content signal 204, provide a promotional opportunity, provide electronic game play enhancement, be a uniform resource locator (URL), be an electronic coupon, provide an index to a database, or the like. In an example embodiment, multiple messages may be encoded in the encoded content signal 204.

In an example embodiment, the message once received (e.g., by the signaled device) may be utilized. For example, the message may be used to trigger the event on the signaled device 214, verify the presence of rights associated with encoded content signal 204, enable use of a promotional opportunity, enhance an electronic game, and the like.

The signaled device 214 may be a DVD recorder, PC based or consumer electronic based personal video recorder, and/or other devices capable of recording content to be viewed or any device that performs an analog to digital conversion for the purpose of storing, redistributing and/or subsequently outputting or otherwise making the encoded content signal 204 available. For example, the signaled device 214 may be a hand-held device such as a portable gaming device, a mobile telephone, and/or a personal digital assistant (PDA). In an example embodiment, the signaled device 214 may be made integral with the inline detector device 210.

An optical detector 208 may receive and process the identification pattern 110 from a display device 206.1 to obtain the message. An implementation of the optical detector 208 is described in greater detail below.

The display devices 206.1, 206.2 may receive the encoded content signal 204 directly from the broadcast source 204 and/or indirectly through the inline detector 210. The display devices 206.1, 206.2 may be devices capable of presenting the content signal 104 (see FIG. 1) and/or the encoded content signal 112, 204 to a viewer such as of an analog or digital television, but may additionally or alternatively include a device capable of recording the content signal 104 and/or the encoded content signal 112, 204 such as a digital video recorder. Examples of the display devices 206.1, 206.2 may include projection televisions, plasma televisions, liquid crystal displays (LCD), personal computer (PC) screens, digital light processing (DLP), stadium displays, devices that may incorporate displays such as toys and personal electronics, and the like.

Figure 3:
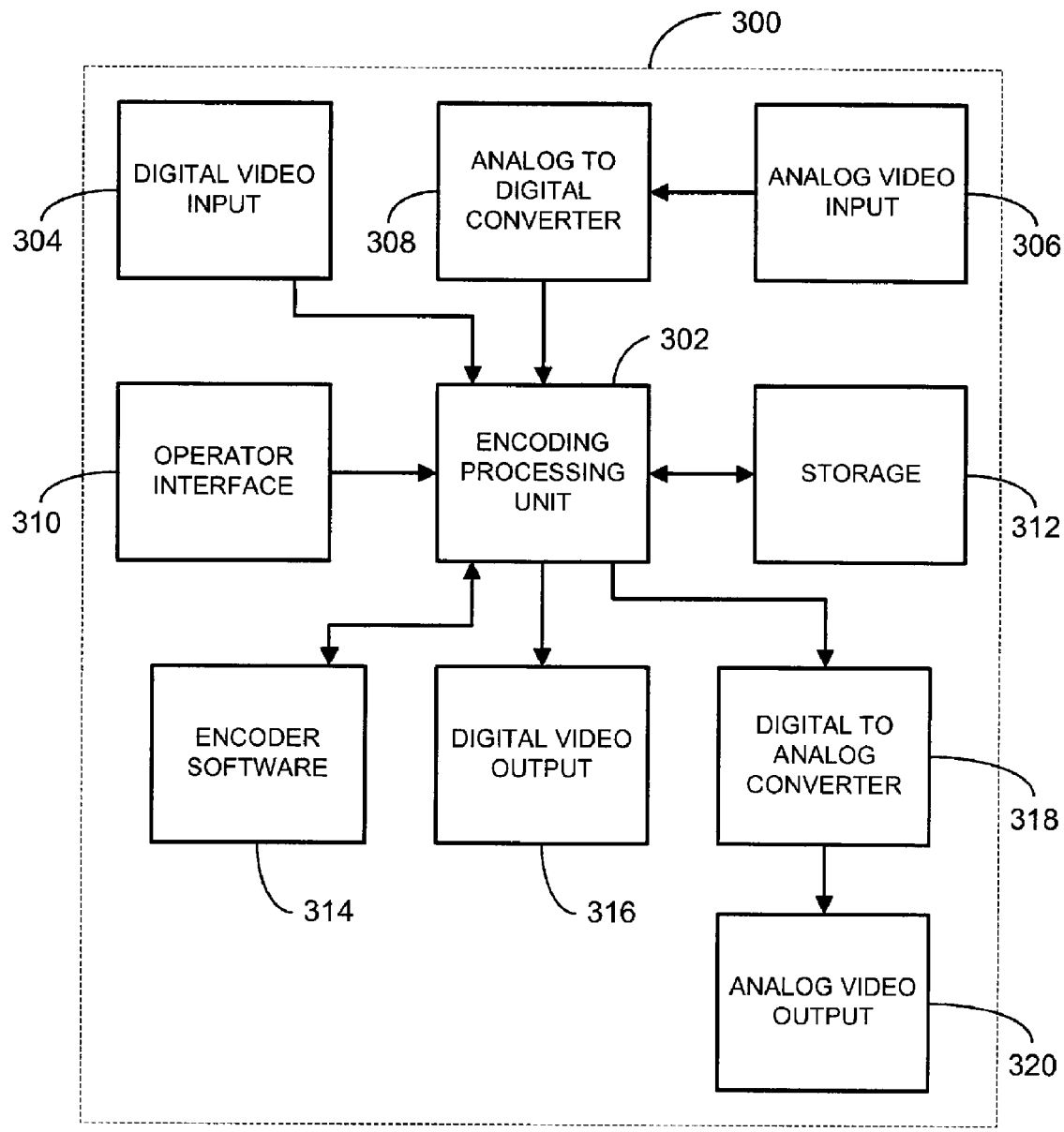
FIG. 3 is a block diagram of an example encoder.

Referring to FIG. 3, an encoder 300 according to an example embodiment is illustrated. In an example embodiment, the components and/or functionally of the encoder 106 (see FIG. 1) may include the components and/or functionally of the encoder 300. In general, the encoder 300 may be a computer with specialized input/output hardware, an application specific circuit, programmable hardware, an integrated circuit, an application software unit, and/or other hardware and/or software combinations. The encoder processing unit 302 may include a central processing unit (CPU).

The encoder 300 may include an encoder processing unit 302 that may direct operation of the encoder 300. For example, the encoder processing unit 302 may alter attributes of the content signal 104 to produce the encoded content signal 112, 204 containing the identification pattern 110 (see FIGS. 1 and 2).

A digital video input 304 may be in operative association with the encoder processing unit 302 and may be capable of receiving the content signal 104 from the signal source 102 (see FIG. 1). However, the encoder 300 may additionally or alternatively receive an analog content signal 104 through an analog video input 306 and an analog-to-digital converter 308. For example, the analog-to-digital converter 308 may digitize the analog content signal 104 such that a digitized content signal 104 may be provided to the encoder processing unit 302.

An operator interface 310 may be operatively associated with encoder processing unit 302 and may provide the encoder processing unit 302 with instructions including where, when and/or at what magnitude the encoder 300 should selectively raise and/or lower a value (e.g., the luminance and/or chrominance level of content lines of the content signal 104 or portions thereof at the direction of the operator 108 of FIG. 1). The instructions may be obtained by the operator interface 310 through a port and/or an integrated operator interface. However, other device interconnects of the encoder 300 may be used including a serial port, universal serial bus (USB), "Firewire" protocol (IEEE 1394), and/or various wireless protocols. In an example embodiment, responsibilities of the operator 108 and/or the operator interface 310 may be partially or wholly integrated with the encoder software 314 such that the encoder 300 may operate in an automated manner.

When encoder processing unit 302 receives operator instructions and the content signal 104, the encoder processing unit 302 may store the luminance information (and/or chrominance information as desired) of the content signal 104 in a storage 312. The storage 312 may have the capacity to hold and retain signals (e.g., fields of the content signal 104 and corresponding audio signals) in a digital form for access (e.g., by the encoder processing unit 302). The storage 312 may be primary storage and/or secondary storage, and may include memory.

After modulating the content signal 104 with the identification pattern 110, the encoder 300 may send the resulting encoded content signal 112, 204 in a digital format through a digital video output 316, or in an analog format by converting the resulting digital signal with a digital-to-analog converter 318 and outputting the encoded content signal 112, 204 by an analog video output 320.

It may be appreciated that the encoder 300 need not include both the digital video input 304 and the digital video output 316 in combination with the analog video input 306 and the analog video output 320. Rather, a lesser number of the inputs 304, 306 and/or the outputs 316, 320 may be included. In addition, other forms of inputting and/or outputting the content signal 104 (and the encoded content signal 112, 204) may be interchangeably used.

In an example embodiment, components used by the encoder 300 may differ when the functionality of the encoder 300 is included in a pre-existing device as opposed to a stand alone custom device. The encoder 300 may include varying degrees of hardware and/or software, as various components may interchangeably be used.

Figure 4:
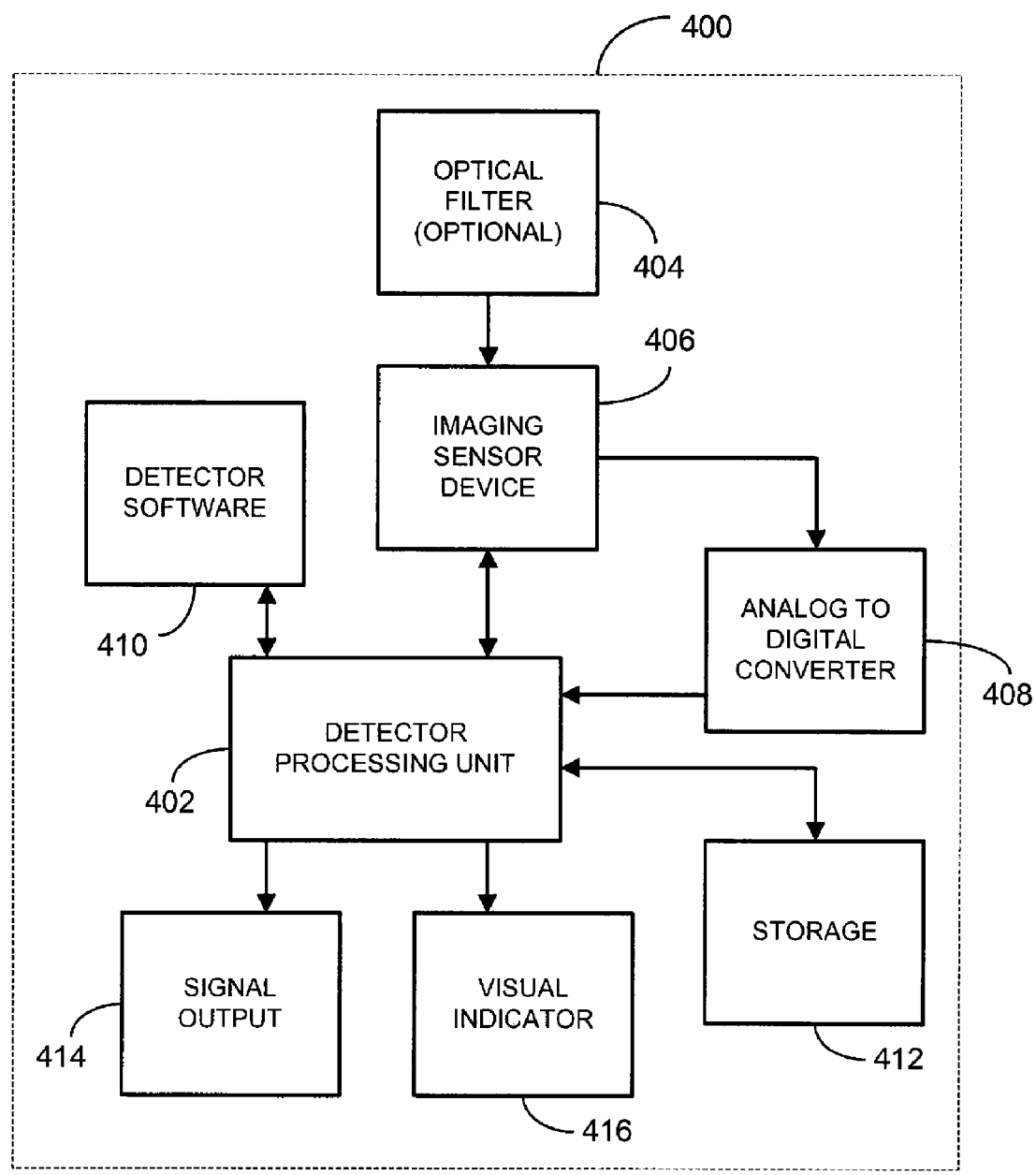
FIG. 4 is a block diagram of an example optical detector.

Referring to FIG. 4, an optical detector 400 according to an example embodiment is illustrated. In an example embodiment, the components and/or functionally of the optical detector 208 (see FIG. 2) may include the components and/or functionally of the optical detector 400.

The optical detector 400 may include an imaging sensor device 406 operatively associated with an analog-to-digital converter 408 and a detector processing unit 402 to optically detect the encoded content signal 112, 204 (e.g., as may be presented on the display device 206.1, 206.2 of FIG. 2).

In an example embodiment, the imaging sensor device 406 may be a CMOS (Complimentary Metal Oxide Semiconductor) imaging sensor, while in another example embodiment the imaging sensor device may be a CCD (Charge-Coupled Device) imaging sensor. The imaging sensor device 406 may be in focus to detect motion on the display device 206.1, 206.2 relative to background.

The detector processing unit 402 may be an application specific circuit, programmable hardware, integrated circuit, application software unit, and/or hardware and/or software combination. The detector processing unit 402 may store the values (e.g., luminance, chrominance, or luminance and chrominance) of the encoded content signal 112, 204 in a storage 412 and may detect content lines and/or portions thereof that have increased or decreased value levels. The detector processing unit 402 may process the encoded content signal 112, 204 to detect the identification pattern 110 (see FIG. 1).

An optional optical filter 404 may be placed over a lens of the imaging sensor device 406 to enhance the readability of the identification pattern 110 contained within the encoded content signal 112, 204. For example, the optical filter 404 may be a red filter, but other filters may also be used A signal output 414 may be electrically coupled to the detector processing unit 402 and provide a data output for the message transmitted by the identification pattern 110 and/or data associated with the message after further processing by the optical detector 400. For example, the data output may be one-bit data and/or multi-bit data.

An optional visual indicator 416 may be further electrically coupled to the detector processing unit 402 and may provide a visual and/or audio feedback to a user of the optical detector 400, which may by way of example include notice of availability of promotional opportunities based on the receipt of the message.

In an example embodiment, the detector processing unit 402 may store the values of the encoded content signal 112, 204 in the storage 412 and detect content lines and/or portions thereof that have increased or decreased values levels. In an example embodiment, the functionality of the storage 412 may include the functionality of the storage 312 (see FIG. 3). An embodiment of a detection scheme is described in greater detail below.

Figure 5:
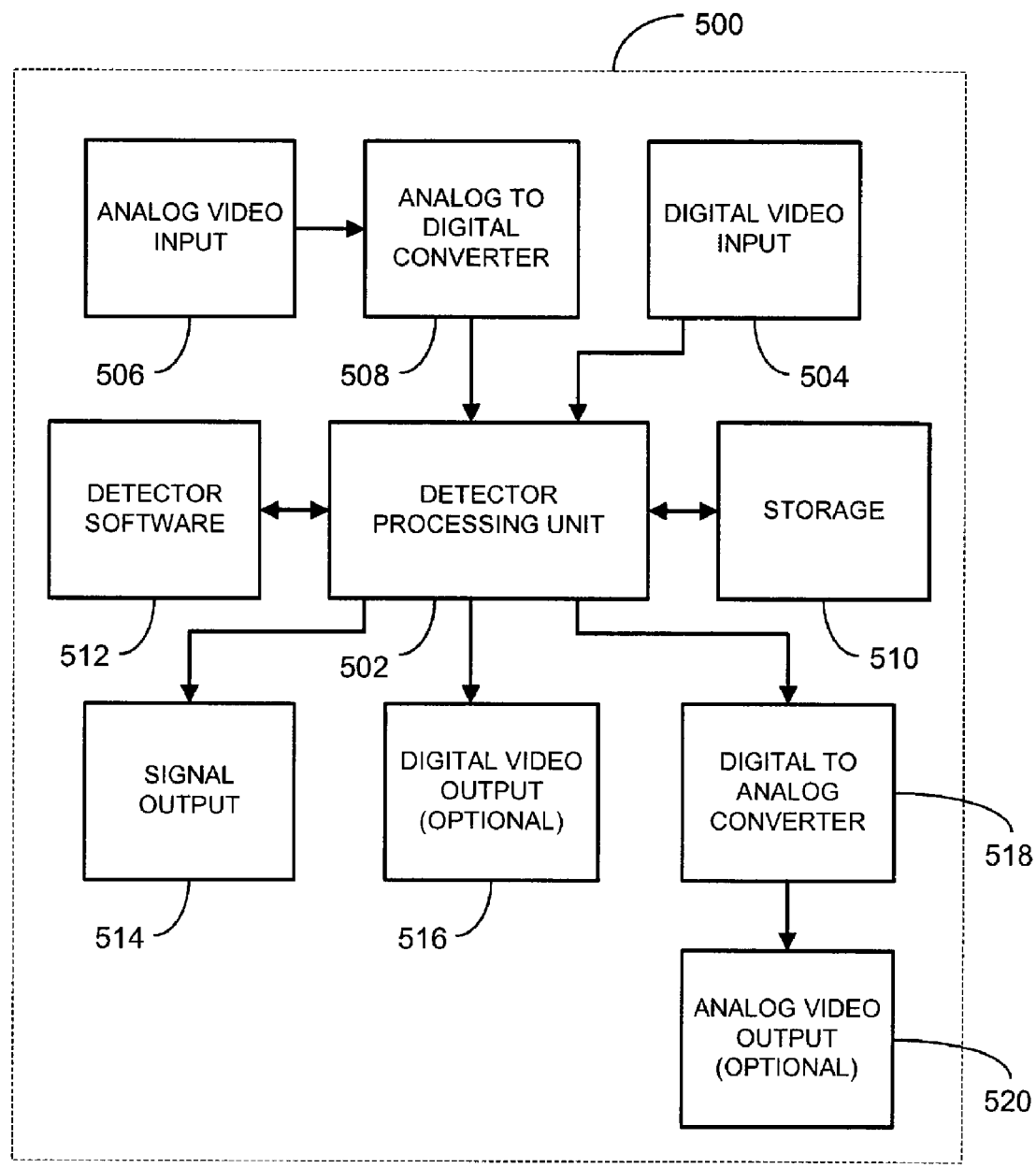
FIG. 5 is a block diagram of an example inline detector.

Referring to FIG. 5, an inline detector 500 according to an example embodiment is illustrated. In an example embodiment, the components and/or functionally of the inline detector 210 (see FIG. 2) may include the components and/or functionally of the optical detector 500.

The inline detector 500 may include an analog video input 506 to receive the encoded content signal 112, 204 from the broadcast source 202 when the encoded content signal 112, 204 is an analog format, and a digital video input 504 for receiving the encoded content signal 112, 204 when the encoded content signal 112, 204 is in a digital format (see FIGS. 1 and 2). For example, the digital video input 504 may directly pass the encoded content signal 112, 204 to a detector processing unit 502, while the analog video input 506 may digitize the encoded content signal 112, 204 by use of an analog-to-digital converter 508 before passing the encoded content signal 112, 204 to the detector processing unit 502. However, other configurations of inputs and/or outputs of encoded content signal 112, 204 may also be used.

The detector processing unit 502 may process the encoded content signal 112, 204 to detect the identification pattern 110 (see FIG. 1). The detector processing unit 502 may be an application specific circuit, programmable hardware, integrated circuit, application software unit, and/or hardware and/or software combination are also contemplated.

In an example embodiment, the detector processing unit 502 may store the values (e.g., luminance, chrominance, or luminance and chrominance) of the encoded content signal 112, 204 in a storage 510 and detect content lines and/or portions thereof that have increased or decreased value levels, which may represent an encoded signal. An implementation of the detection scheme is described in greater detail below.

The message transmitted by the identification pattern 110 may be transferred from the inline detector 500 to the signaled device 214 (see FIG. 2) by a signal output 514. The inline detector 500 may optionally output the encoded content signal 112, 204 in a digital format through a digital video output 516 and/or in an analog format by first converting the encoded content signal 112, 204 from the digital format to the analog format by use of an digital-to-analog converter 518, and then outputting the encoded content signal 112, 204 through an analog video output 520. However, the inline detector 500 need not output the encoded content signal 112, 204 unless otherwise desired.

Figure 6:
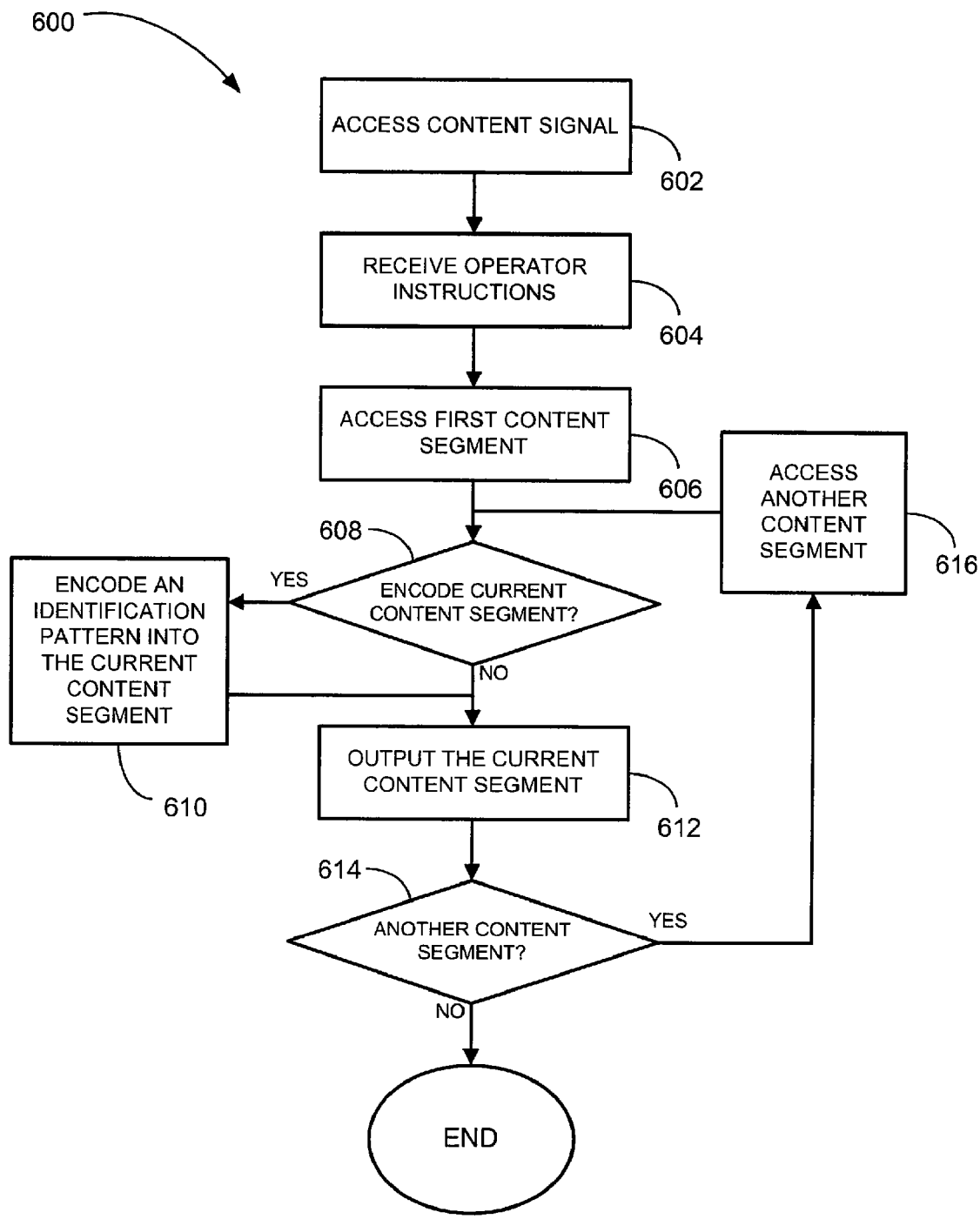
FIG. 6 is a flowchart illustrating a method, in accordance with an example embodiment, for encoding a content signal.

Referring to FIG. 6, a method 600 for encoding a content signal 104 (see FIG. 1) according to an example embodiment is illustrated. In an example embodiment, the method 600 may be performed on the encoder 106, 300 (see FIGS. 1 and 3).

The content signal 104 may be accessed from the signal source 102 (see FIG. 1) at block 602. The instructions may be received from the operator 108 at block 602. For example, the encoder 106, 300 may obtain the content signal 104 at block 602 and receive the operator instructions at block 604.

In an example embodiment, the operator instructions may instruct the encoder 106, 300 to encode one or more identification patterns 110 over a series of two or more consecutive content segments of the content signal 104. In an example embodiment, the operator instructions may direct the encoder 106, 300 to encode one or more identification patterns 110 within one or more content segments, then not encode one or more content segments, then again encode one or more content segments. Other schemes of designating content segments for encoding by operator instructions may also be used.

In an example embodiment, the operations of block 602 and block 604 may occur concurrently or near-concurrently, while in another embodiment the operations of block 602 may be completed prior to starting the operations at block 604.

A first content segment of the content signal 104 may be accessed at block 606. The content segment may be a frame and/or a field of the content signal. For example, the first content segment may be identified as a current content segment (e.g., when the content signal 104 is stored on encoder 106, 300 prior to encoding) and/or obtained as the current content segment (e.g., when the content signal 104 is being read a content segment at a time from the signal source 102).

At decision block 608, a determination may be made whether to encode the current content segment. If the current content segment is to be encoded, the method 600 may encode one or more patterns (e.g., the one or more identification patterns 110 of FIG. 1) into the current content segment of the content signal 104 (e.g., as may be defined by the operator instructions) at block 610. In an example embodiment, the operations at block 610 may be performed by superimposing the identification pattern 110 into the current content segment and/or by inserting the identification pattern 110 into the current content segment.

It should be appreciated that the identification pattern 110 encoded at block 610 may be encoded in a substantially invisible way (e.g., the identification pattern 110 is not normally visually detectable by a typical viewer). For example, an amount of adjustment to the values (e.g., luminance, chrominance or luminance and chrominance) by using a modulation method for the encoding method 600 may be small enough so as to make the identification pattern 110 substantially invisible within the encoded content signal 112, 204. The one or more content segments selected for encoding may enable the identification pattern 110 to be substantially invisible within the encoded content signal 112, 204.

In an example embodiment, the identification pattern 110 may be encoded over an entire portion of the one or more particular content segments selected for encoding, while in another embodiment the identification pattern 110 may be encoded over a lesser portion of the one or more particular content segments selected for encoding. For example, the lesser portion of the one or more content segments selected for encoding may change its size, location, or size and location within the identification pattern 110 selected for encoding.

If a determination is made not to encode the current content segment at decision block 608 or after block 610, the method 600 may proceed to block 612.

The current content segment may be outputted at block 612. For example, the encoder may provide the current content segment to the broadcast source 114 (see FIG. 1) at block 612.

At decision block 614, a determination may be made as to whether there is another content segment in the content signal 104. If there is another content segment, another content segment may be accessed as the current content segment at block 616 and the method 600 may return to decision block 608. If there is not another content segment at decision block 608, the method 600 may terminate.

In an example embodiment, if there are no more content segments at decision block 614, the encoded content signal 112, 204 may be outputted from the encoder 106, 300 to the broadcast source 114 in addition to or instead of outputting each content segment at block 612.

Figure 7:
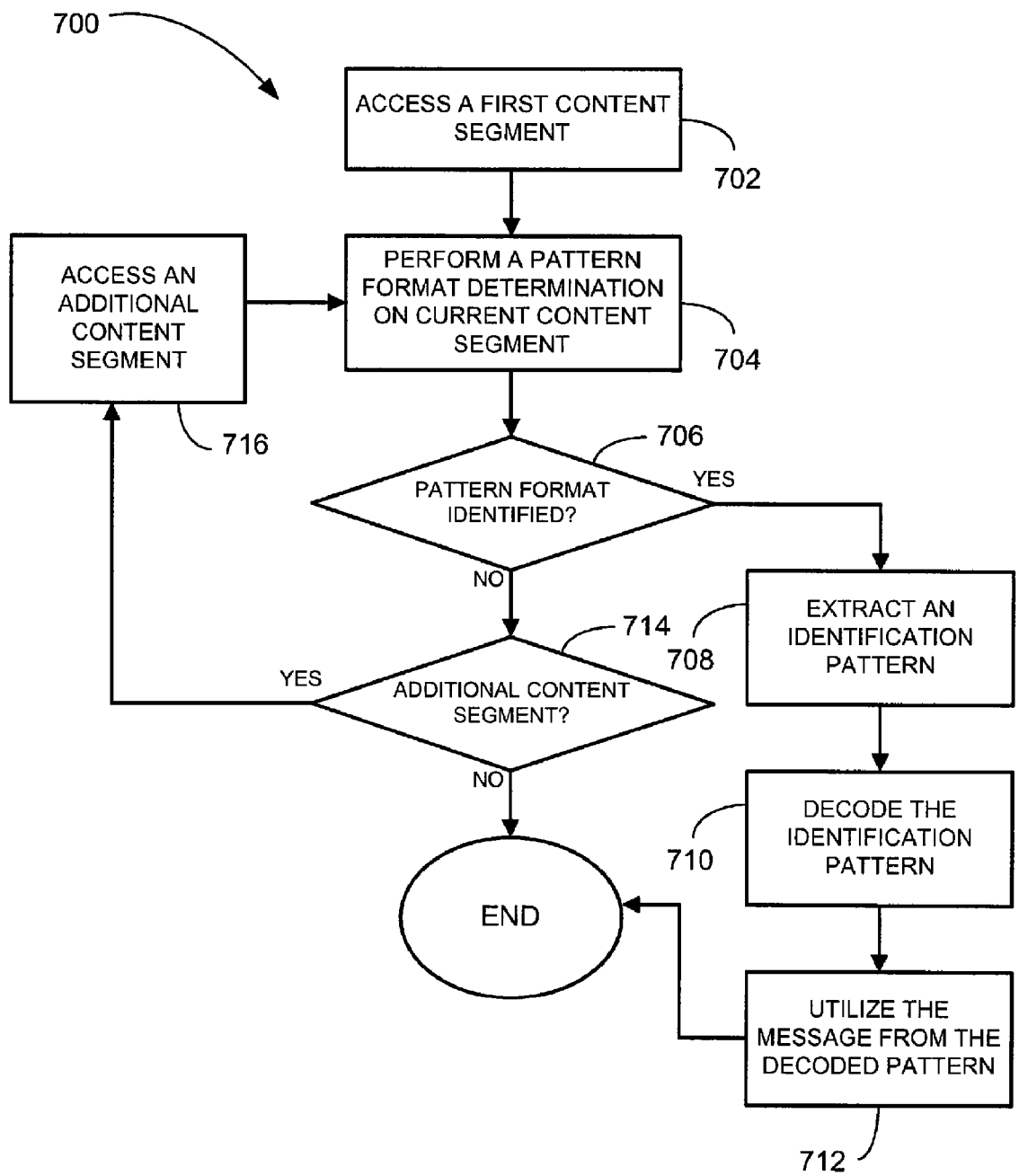
FIG. 7 is a flowchart illustrating a method, in accordance with an example embodiment, for single pattern detection and identification.

Referring to FIG. 7, a method 700 for single encoded pattern detection and identification according to an example embodiment is illustrated. In an example embodiment, the method 700 may be performed on the optical detector 208, 400 and/or the inline detector 210, 500 (see FIGS. 2, 4 and 5).

A first content segment of the encoded content signal 112 may be obtained at block 702. Thereafter, a pattern format determination may be performed on a current content segment at block 704. The pattern format determination may identify whether the current content segment includes a pattern format (e.g., indicia that the current content segment includes the identification pattern 110 of FIG. 1). For example, the pattern format may be identified when segment differences of the content segment appear to be in a format of a pattern, when a first pattern portion and a second pattern portion are located in the content segment, and the like. Example embodiments of performing pattern format determinations are described in greater detail below.

At decision block 706, a determination may be made as to whether the current content segment has been identified as being in the pattern format. If current content segment has been identified as being in the pattern format at decision block 706, the identification pattern 110 may be extracted from encoded content signal 112, 204 at block 708. An example embodiment for extracting the identification pattern 110 is described in greater detail below.

The identification pattern 110 may be decoded at block 710 to obtain a message. For example, the decoding at block 710 may include translating the identification pattern 110 into the message, matching the identification pattern 110 to a known pattern (e.g., a prestored on a detection device 208, 210, 400, 500) to obtain the message, and the like. The method 700 may then utilize the message at block 712.

If a pattern format has not been identified at decision block 706, the method 700 may determine whether there is an additional content segment at decision block 714. If there is an additional content segment, the method 700 may obtain an additional content segment at block 716 and return to block 714. If there are no additional content segments at decision block 714 or after completing the operations at block 712, the method 700 may terminate.

Figure 8:
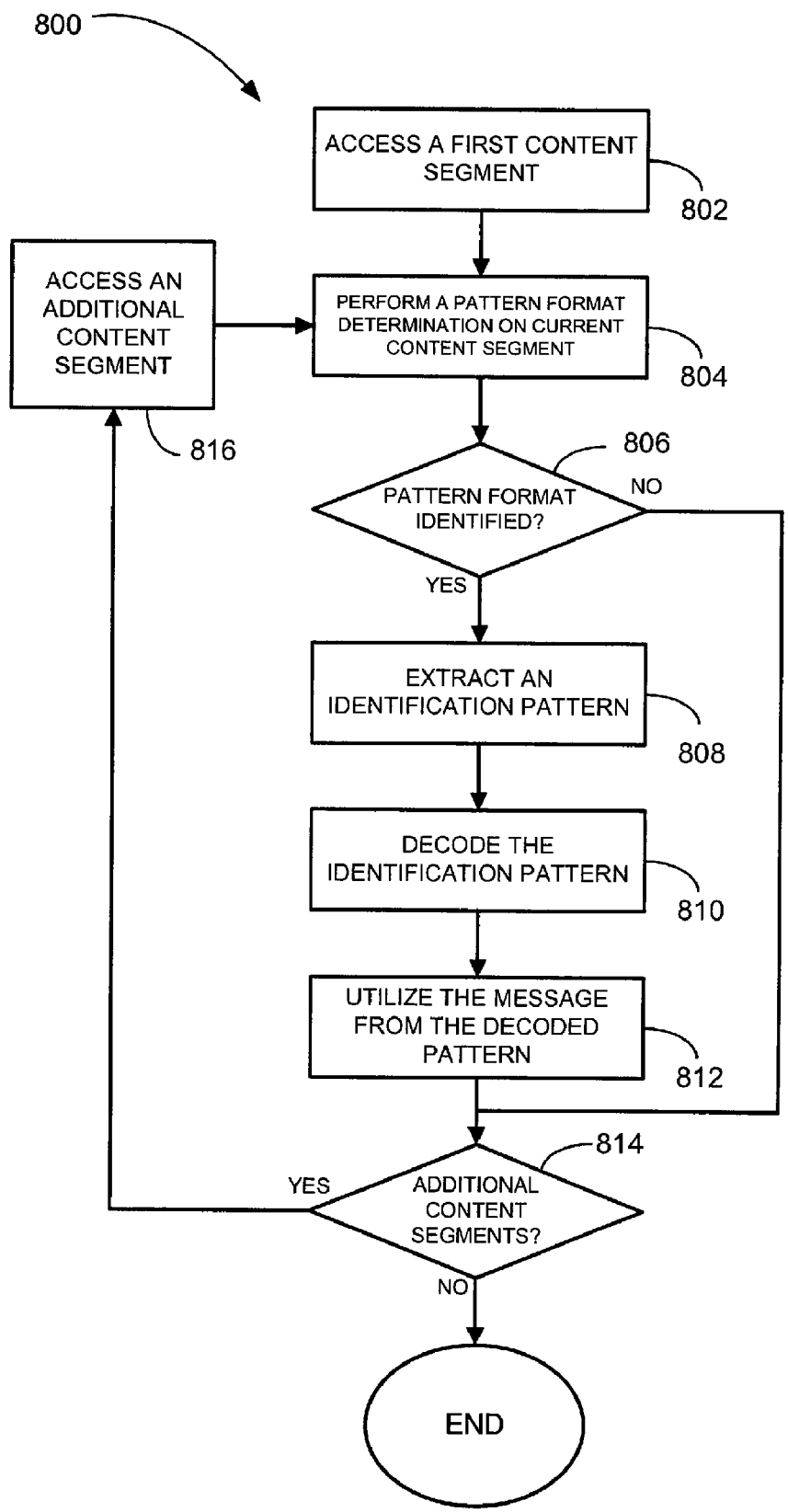
FIG. 8 is a flowchart illustrating a method, in accordance with an example embodiment, for multiple pattern detection and identification.

Referring to FIG. 8, a method 800 for multiple encoded patterns detection and identification according to an example embodiment is illustrated. In an example embodiment, the method 800 may be performed on the optical detector 208, 400 and/or the inline detector 210, 500 (see FIGS. 2, 4 and 5).

A first content segment of encoded content signal 112 may be obtained at block 802. Thereafter, a pattern format determination may be performed on a current content segment at block 804. For example, pattern format determination may determine whether the current content segment includes the identification pattern 110.

At decision block 806, a determination may be made as to whether the current content segment has been identified as being in the pattern format. If the current content segment has been identified as being in the pattern format at decision block 806, the identification pattern 110 may be extracted from encoded content signal 112, 204 at block 808. An example embodiment for extracting the identification pattern 110 is described in greater detail below.

The identification pattern 110 may be decoded at block 810 to obtain a message. For example, the decoding at block 810 may include translating the identification pattern 110 into the message, matching the identification pattern 110 to a known pattern (e.g., a prestored on a detection device 208, 210, 400, 500) to obtain the message, and the like. The method 800 may then utilize the message at block 812.

If a pattern format has not been identified at decision block 706 or after decision block 806, the method 800 may determine whether there is an additional content segment at decision block 814. If there is an additional content segment, the method 800 may obtain an additional content segment at block 816 and return to block 814. If there are no additional content segments at decision block 814, the method 800 may terminate.

Figure 9:
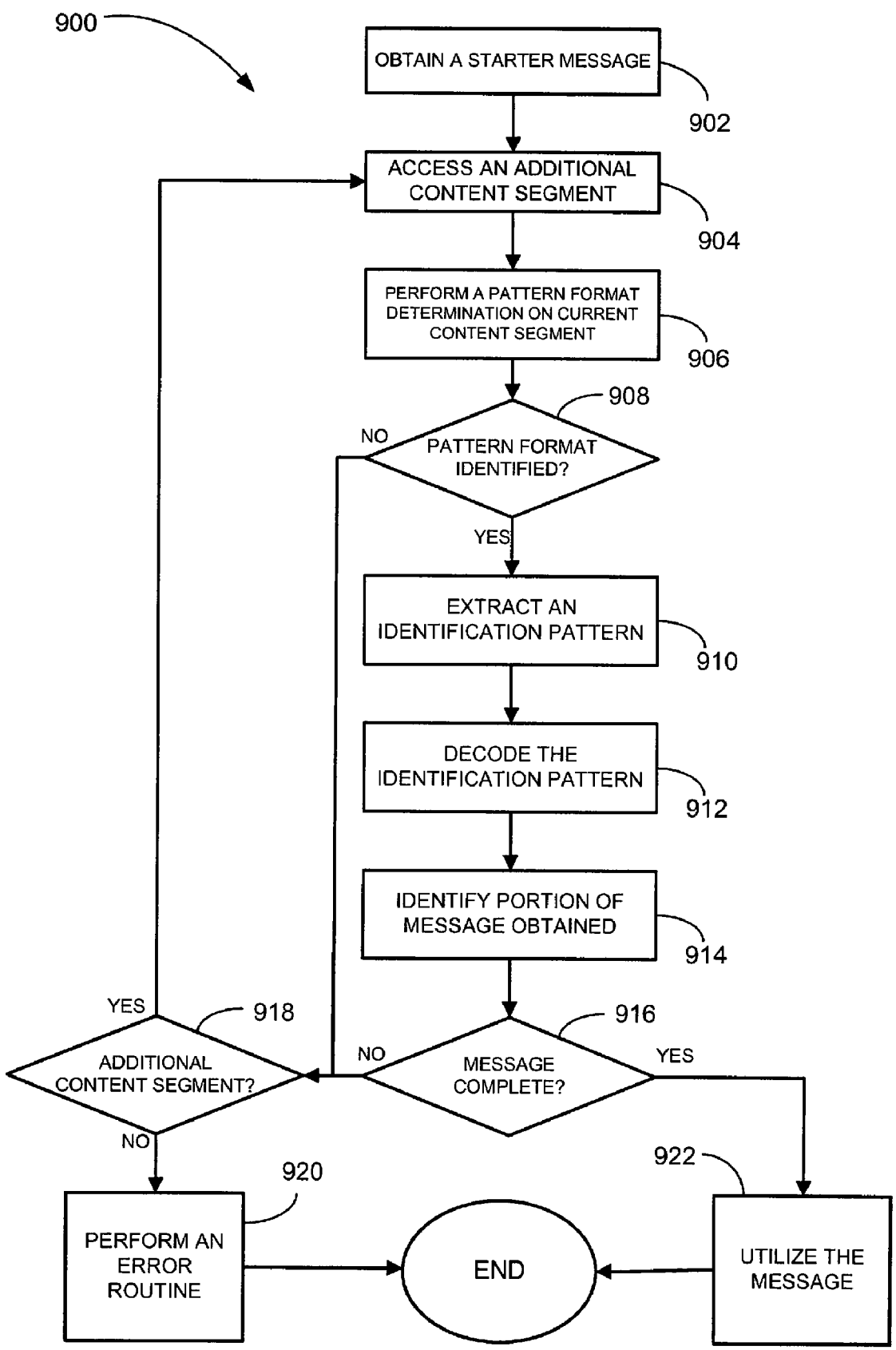
FIG. 9 is a flowchart illustrating a method, in accordance with an example embodiment, for message detection with multiple patterns.

Referring to FIG. 9, a method 900 for message detection with multiple patterns in accordance with an example embodiment is illustrated. In an example embodiment, the method 800 may be performed on the optical detector 208, 400 and/or the inline detector 210, 500 (see FIGS. 2, 4 and 5).

A starter message may be obtained at block 902. For example, the starter message may be obtained by performing the method 700 (see FIG. 7). In an example embodiment, the starter message may indicate a number of patterns to be received to indicate an entire message.

An additional content segment from the encoded content signal 112, 204 (see FIGS. 1 and 2) may be accessed at block 904. Thereafter, a pattern format determination may be performed on a current content segment at block 906. For example, pattern format determination may determine whether the current content segment includes the identification pattern 110.

At decision block 908, a determination may be made as to whether the current content segment has been identified as being in the pattern format. If the current content segment has been identified as being in the pattern format at decision block 908, the identification pattern 110 may be extracted from encoded content signal 112, 204 at block 910. An example embodiment for extracting the identification pattern 110 is described in greater detail below.

The identification pattern 110 may be decoded at block 912 to obtain a portion of a message. For example, the decoding at block 912 may include translating the identification pattern 110 into a portion of the message, matching the identification pattern 110 to a known pattern (e.g., a prestored on a detection device 208, 210, 400, 500) to obtain a portion of the message, and the like.

At decision block 916, the method 900 may determine whether the message is complete (e.g., all portions of the message have been received). If the message is complete, the message may be utilized at block 922. If the entire message has not been received at decision block 916 or if the pattern format is not identified at decision block 908, the method 900 may proceed to decision block 918.

The method 900 may determine at decision block 918 whether an additional content segment is available. If another content segment is available, the method 900 may return to block 904. If another content segment is not available at decision block 918, an error routine may be performed at block 920. After completion of the operations at block 920 or block 922, the method 900 may terminate.

Figure 10:
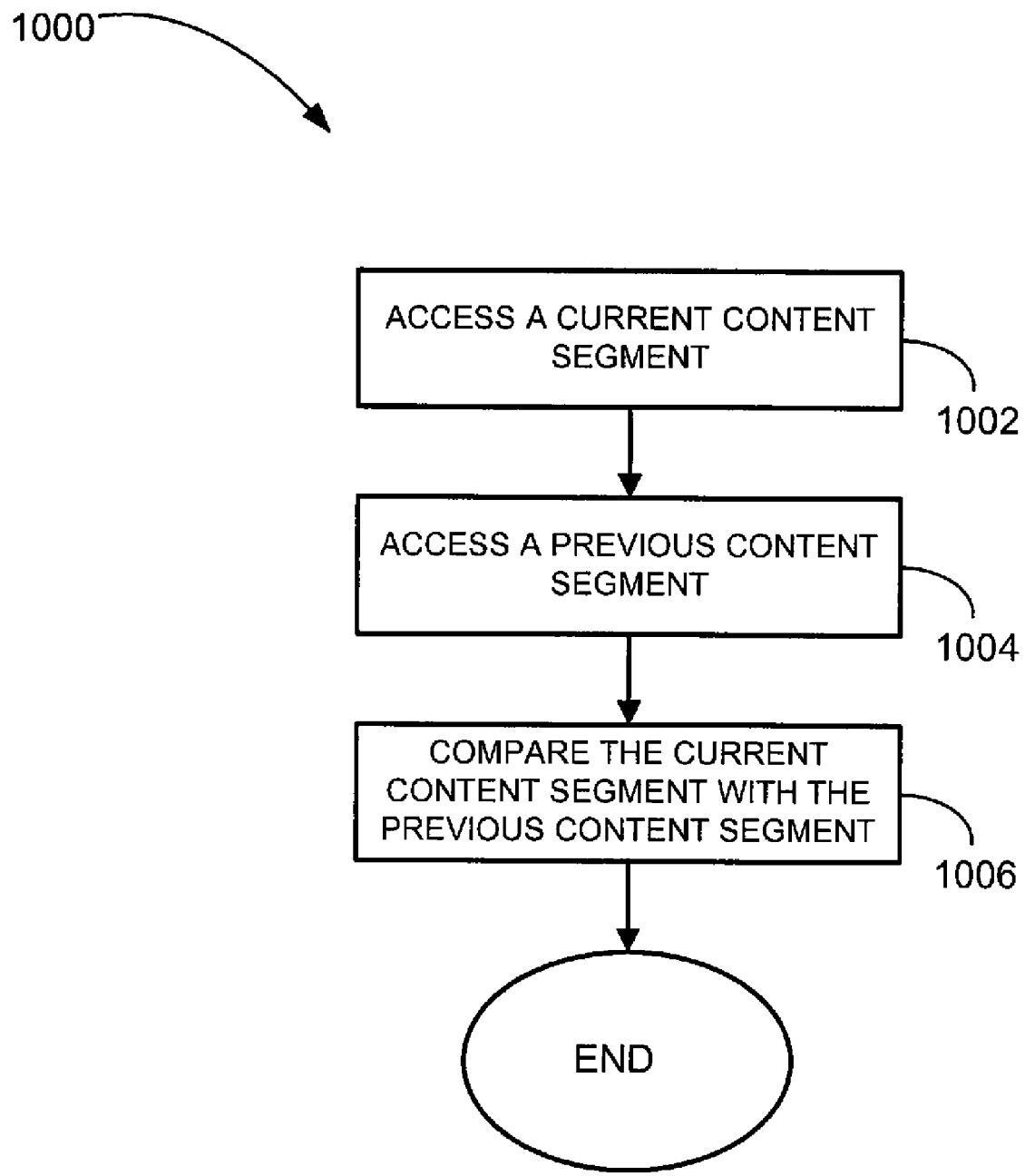
FIG. 10 is a flowchart illustrating a method, in accordance with an example embodiment, for determining pattern format by comparison.

Referring to FIG. 10, a method 1000 for determining pattern format by comparison according to an example embodiment is illustrated. In an example embodiment, the method 1000 may be performed at block 704, block 804, and/or block 906 (see FIGS. 7-9).

A current content segment of the encoded content signal 112, 204 may be accessed at block 1002. A previous content segment of the encoded content signal 112, 204 may be accessed at block 1004.

The method 1000 may compare the current content segment with the previous content segment at block 1006 to determine whether the current content segment is in the pattern format. For example, the comparison may be by subtracting the previous content segment from the current content segment, where a resulting signal may be the encoded pattern. Upon completion of the operations at block 1006, the method 1000 may terminate.

Figure 11:
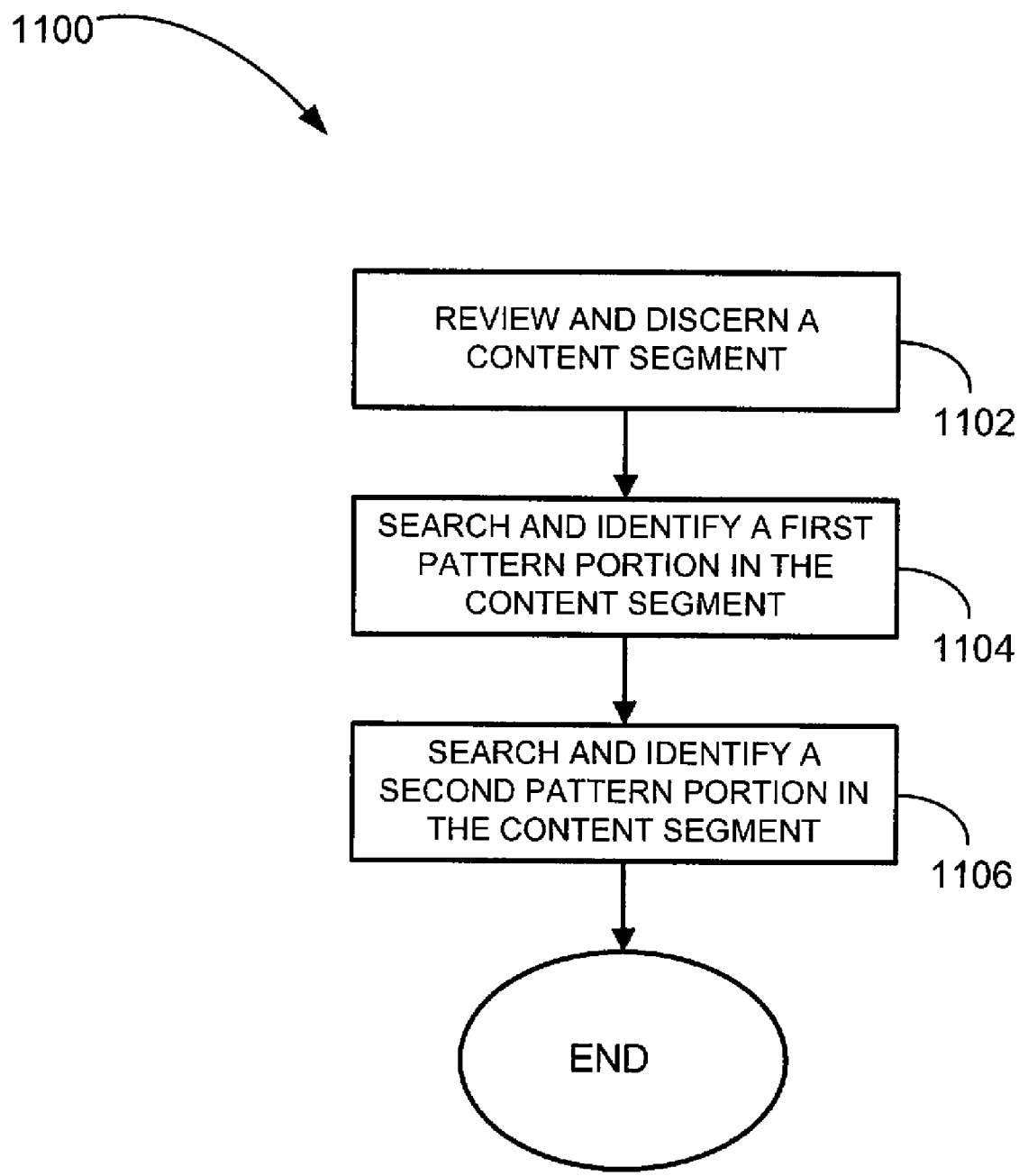
FIG. 11 is a flowchart illustrating a method, in accordance with an example embodiment, for determining pattern format by image recognition.

Referring to FIG. 11, a method 1100 for determining pattern format by image recognition according to an example embodiment is illustrated. In an example embodiment, the method 1100 may be performed at block 704, block 804, and/or block 906 (see FIGS. 7-9).

A content segment may be reviewed and discerned at block 1102. For example, reviewing and discerning the content segment may include the imaging sensor device 460 (see FIG. 4) searching for minor variations among pixels of the content segment to determine if a pattern is present in the content segment.

The method 1100 may search for and identify a first pattern portion in the content segment at block 1104. For example, the first pattern portion may include a horizontal bar (e.g., a bottom bar) and a vertical bar (e.g., a far left bar) of a square.

The method 1100 may search for and identify a second pattern portion in the content segment at block 1106. For example, the second pattern portion may include the pattern contained in part by the horizontal bar and the vertical bar of the square. In an example embodiment, the pattern format may be identified if the first pattern portion and the second pattern portion are identified in the content segment. Upon completion of the operations at block 1106, the method 1100 may terminate.

Figure 12:
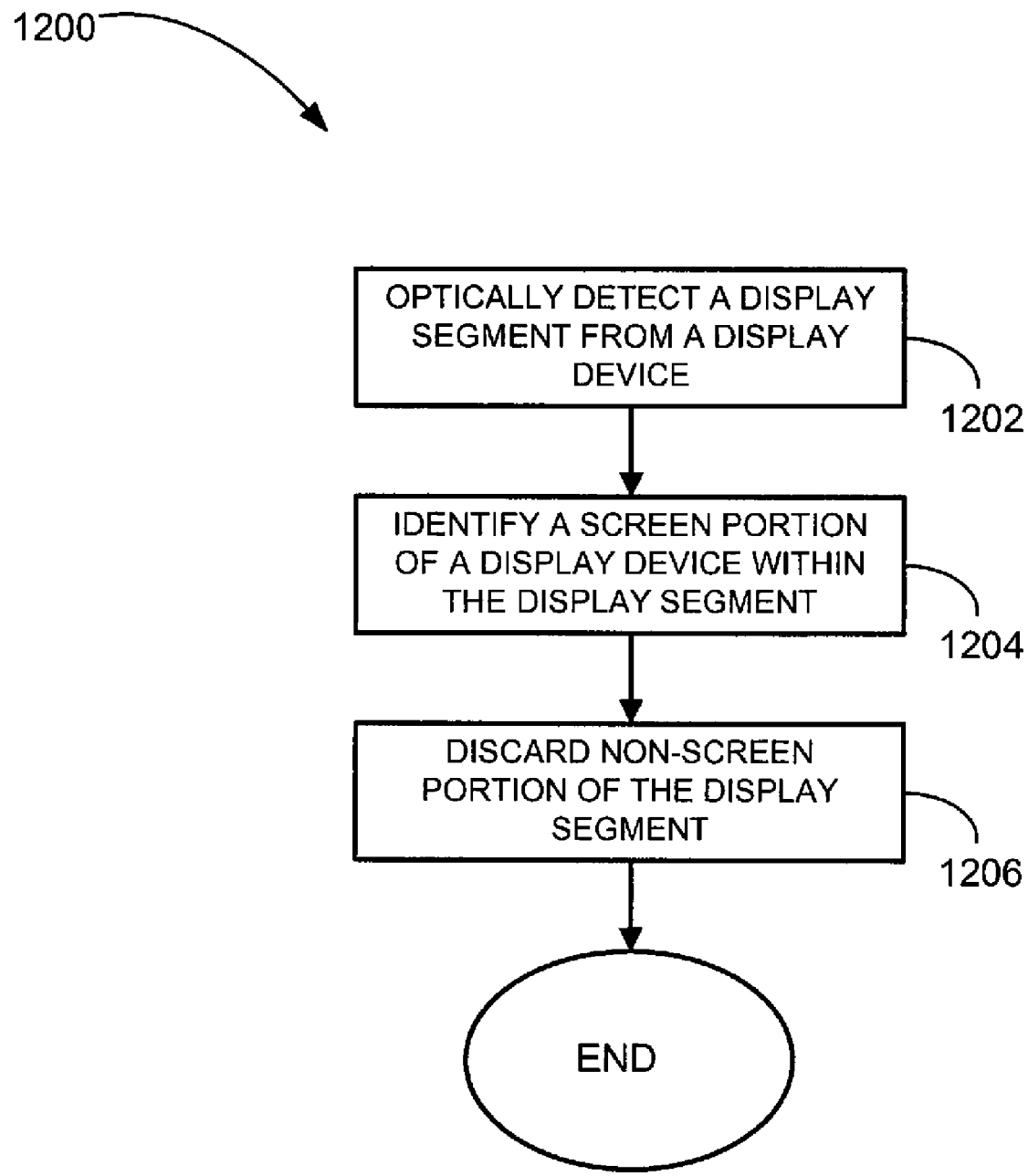
FIG. 12 is a flowchart illustrating a method, in accordance with an example embodiment, for accessing a content segment.

Referring to FIG. 12, a method 1200 for accessing a content segment according to an example embodiment is illustrated. In an example embodiment, the method 1100 may be performed at block 702, block 716, block 802, block 816, and/or block 904 (see FIGS. 7-9).

A display segment may be optically detected from the display device 206.1 at block 1202. For example, the display segment may be optically detected by taking a picture directed towards a screen of the display device 206.1 with the imaging sensor 406 of the optical detector 400.

A screen portion of the display device 206.1 may be identified within the display segment at block 1204. Thereafter, a non-screen portion of the display segment may be discarded such that a remaining portion of the detected segment is the content segment. Upon completion of the operations at block 1206, the method 1200 may terminate.

Figure 13:
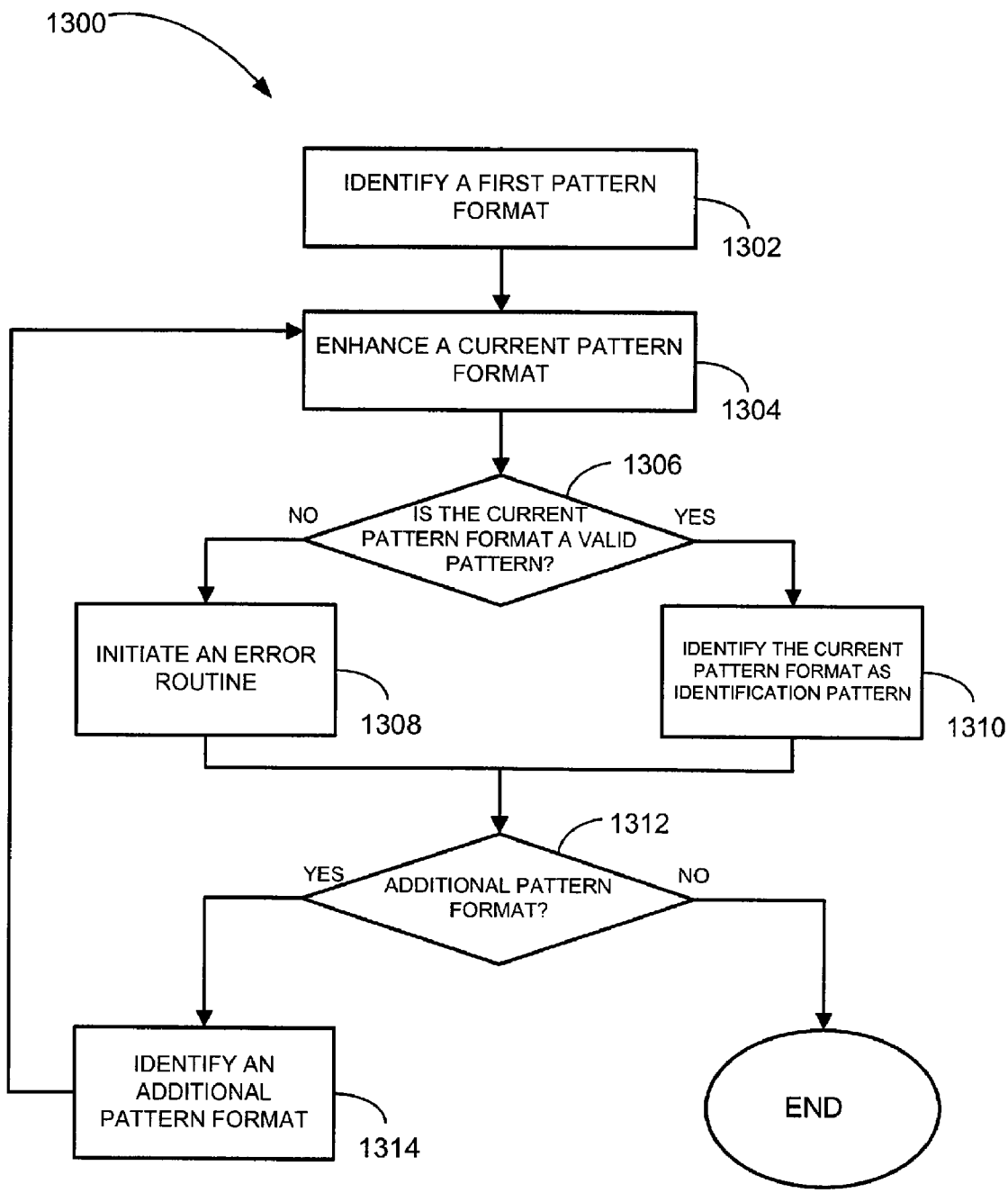
FIG. 13 is a flowchart illustrating a method, in accordance with an example embodiment, for extracting an encoded pattern.

Referring to FIG. 13, a method 1300 for extracting the identification pattern 110 (see FIG. 1) according to an example embodiment is illustrated. In an example embodiment, the method 1300 may be performed at block 708, block 808 and/or block 910 (see FIGS. 7-9).

A first pattern format may be identified in a content segment at block 1302.

A current pattern format may be enhanced at block 1304. For example, the enhancement performed at block 1302 may include adopting a threshold by which pixels above the threshold are made black and pixels below the threshold are made white. Other enhancements that may enhance contrast of the current pattern format (e.g., such that the detector 208, 210 of FIG. 2 may be able to more easily decode the one or more identification patterns 110) may also be used.

At decision block 1306, the method 1300 may determine whether the current pattern format is a valid pattern. For example, the current pattern format may be valid when it matches one or more prestored patterns and/or when the current pattern format is a valid bar code.

If the current pattern indicia is determined to be valid at decision block 1306, the method 1300 may identify the current pattern format as an encoded pattern for further processing. If the current pattern format is determined not to be valid (e.g., invalid) at decision block 1308, the method 1300 may initiate an error routine. For example, the error routine may include dumping data and/or storing the data for analysis purposes.

At decision block 1312, the method 1300 may determine whether there is another pattern format present in the content segment. If there is another pattern format present in the content segment, another pattern format may be identified at block 1314 and the method 1300 may return to block 1304. If there is not another pattern formats at decision block 1312, the method 1300 may terminate.

Figure 14:
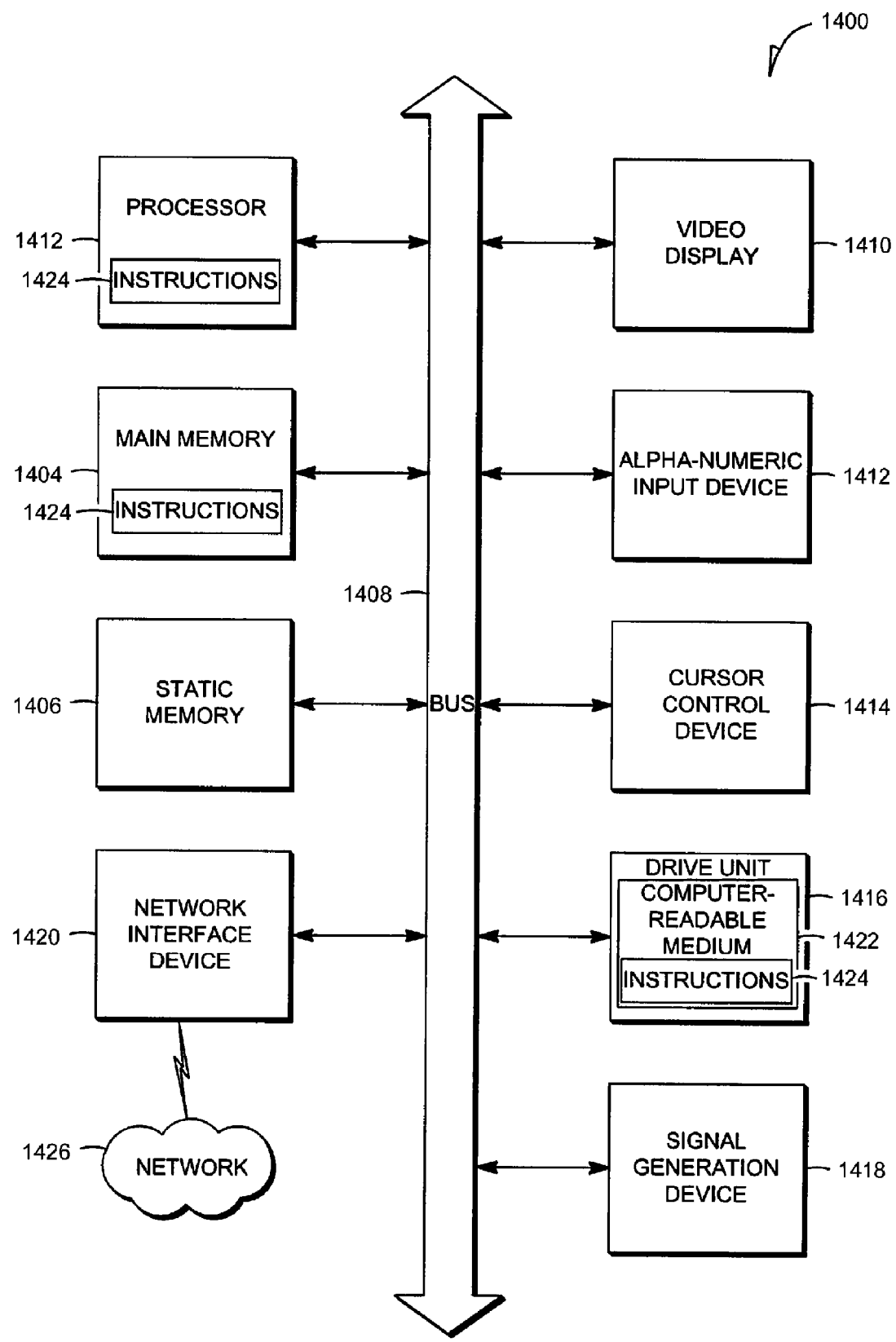
FIG. 14 is a block diagram diagrammatic representation of machine in the example form of a computer system within which a set of instructions, for causing the machine to perform any one or more of the methodologies discussed herein, may be executed.

FIG. 14 shows a diagrammatic representation of machine in the exemplary form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a television, a Personal Digital Assistant (PDA), a cellular telephone, a portable music player (e.g., a portable hard drive audio device such as an MP3 player), a car audio device, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1400 includes a processor 1402 (e.g., a central processing unit (CPU) a graphics processing unit (GPU) or both), a main memory 1404 and a static memory 1406, which communicate with each other via a bus 1408. The processor 1402 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1402 may execute instructions and includes that portion of the computer system 1400 that controls the operation of the entire computer system 1400.

The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The cursor control device 1414 may be a keyboard, mouse or other pointing device, trackball, touchpad, touch screen, keypad, microphone, voice recognition device, or any other appropriate mechanism for the user to input data to the computer 1400 and manipulate the user interface previously discussed. Although only one input device 1414 is shown, in another embodiment any number and type of input devices may be present.

The disk drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via network interface device 1430. The network 1426 may be any suitable network and may support any appropriate protocol suitable for communication to the computer system 1400. In an embodiment, the network 1426 may support wireless communications. In another embodiment, the network 1426 may support hard-wired communications, such as a telephone line or cable. In another embodiment, the network 1426 may support the Ethernet IEEE (Institute of Electrical and Electronics Engineers) 802.3x specification. In another embodiment, the network 1426 may be the Internet and may support IP (Internet Protocol). In another embodiment, the network 1426 may be a local area network (LAN) or a wide area network (WAN). In another embodiment, the network 1426 may be a hotspot service provider network. In another embodiment, the network 1426 may be an intranet. In another embodiment, the network 1426 may be a GPRS (General Packet Radio Service) network. In another embodiment, the network 1426 may be any appropriate cellular data network or cell-based radio network technology. In another embodiment, the network 1426 may be an IEEE 802.11 wireless network. In still another embodiment, the network 1426 may be any suitable network or combination of networks. Although one network 1426 is shown, in other embodiments any number of networks (of the same or different types) may be present.

While the machine-readable medium 1422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 1400 may be implemented using any suitable hardware and/or software, such as a personal computer or other electronic computing device. Encoders, detectors, portable computers, laptop or notebook computers, PDAs (Personal Digital Assistants), pocket computers, appliances, telephones, and mainframe computers are examples of other possible configurations of the computer system 1400. For example, other peripheral devices such as audio adapters or chip programming devices, such as EPROM (Erasable Programmable Read-Only Memory) programming devices may be used in addition to, or in place of, the hardware already depicted.

Thus, a method and system to perform pattern-based encoding and detection have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 302 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating a message on an encoder, the message including a trigger for enhancement of game play associated with a game and game play enhancement data associated with the game;
generating a bar code from the message on the encoder, the bar code including the trigger and the game play enhancement data;
encoding the bar code on the encoder in an active portion of a video signal, the video signal being associated with the game; and
providing the encoded video signal to a broadcast source, the broadcast source capable of distributing the encoded video signal to a viewer.

2. The method of claim 1, further comprising:
receiving an operator instruction on the encoder; and
selecting a plurality of frames for encoding on the encoder based on receiving the operator instruction,
wherein encoding the bar code on the encoder is based on selection of the plurality of frames.

3. The method of claim 2, further comprising:
selecting an area of the plurality of frames on the operator instruction;
wherein encoding the bar code on the encoder is based on selection of the plurality of frames and the area.

4. The method of claim 1, further comprising:
generating an additional message on the encoder, the additional message including an additional trigger for enhancement of the game play;
generating an additional bar code from the additional message on the encoder, the additional bar code including the trigger and the game play enhancement data; and
encoding the additional bar code on the encoder in the active portion of the video signal.

5. The method of claim 1, wherein the video signal is a digital video signal.

6. The method of claim 1, wherein the bar code is encoded imperceptibly in the frame a plurality of frames of the video signal.

7. The method of claim 1, wherein the bar code is a multi-dimensional bar code.

8. The method of claim 1, wherein that broadcast source is a DVD device.

9. The method of claim 1, wherein encoding the bar code comprises:
encoding the bar code on the encoder in an active portion of a plurality of adjacent frames of the video signal.

10. The method of claim 1, wherein encoding the bar code comprises:
encoding the bar code on the encoder in the active portion of the video signal in a substantially invisible way.

11. A method comprising:
optically receiving an encoded video signal on a mobile electronic device from an electronic display device, the encoded video signal including a bar code encoded in an active portion of a plurality of frames of the encoded video signal;
identifying a portion of the encoded video signal as being in a bar code pattern format on the mobile electronic device;
decoding the bar code on the mobile electronic device to recover a message, the message including a trigger for enhancement of game play associated with an electronic game and game play enhancement data; and
enhancing the game play of the electronic game on the mobile electronic device using the game play enhancement data based on the trigger.

12. The method of claim 11, further comprising:
determining whether the bar code is valid on the mobile electronic device,
wherein decoding the bar code is based on a determination that the bar code is valid.

13. The method of claim 11, wherein the display device is a digital television.

14. The method of claim 11, further comprising:
notifying the user regarding the message based on decoding the bar code.

15. The method of claim 11, wherein a single frame of the video signal corresponds to the image.

16. The method of claim 11, wherein the video signal is a high definition (HD) video signal.

17. The method of claim 11, wherein the active portion is the visible portion of the encoded video signal when displayed on a display device, and the bar code is displayable in the visible portion.

18. The method of claim 11, wherein a portion of a frame of the video signal in which the bar code is encoded is in a bar code pattern format, further comprising:
enhancing the bar code pattern format by use of a pixel value threshold,
wherein decoding of the bar code to recover the message is based on enhancement of the bar code pattern format.

19. A non-transitory computer-readable storage medium comprising instructions, which when executed by a processor, cause the processor to:
optically receive an image of a video signal on a mobile electronic device from an electronic display device;
identify a bar code in an active portion of the video signal on the mobile electronic device;
decode the bar code on the mobile electronic device to recover a message, the message including a trigger for enhancement of game play associated with an electronic game and game play enhancement data; and
enhance the game play of the electronic game on the mobile electronic device using the game play enhancement data based on the trigger, the game play occurring synchronously with the video signal.

* * * * *

UNITED STATES PATENT AND TRADEMARK OFFICE
CERTIFICATE OF CORRECTION

| | |
|---|---|
| PATENT NO. | : 7,974,435 B2 |
| APPLICATION NO. | : 11/532835 |
| DATED | : July 5, 2011 |
| INVENTOR(S) | : Alan G. Maltagliati et al. |

It is certified that error appears in the above-identified patent and that said Letters Patent is hereby corrected as shown below:

Column 13

Line 38 (Claim 6, line 2) delete "the frame" between "imperceptibly in" and "a plurality"

Signed and Sealed this
Twenty-seventh Day of September, 2011

David J. Kappos
*Director of the United States Patent and Trademark Office*